R. E. HELLMUND.
SYSTEM OF CONTROL.
APPLICATION FILED SEPT. 7, 1917.
1,320,057.
Patented Oct. 28, 1919.
3 SHEETS—SHEET 1.
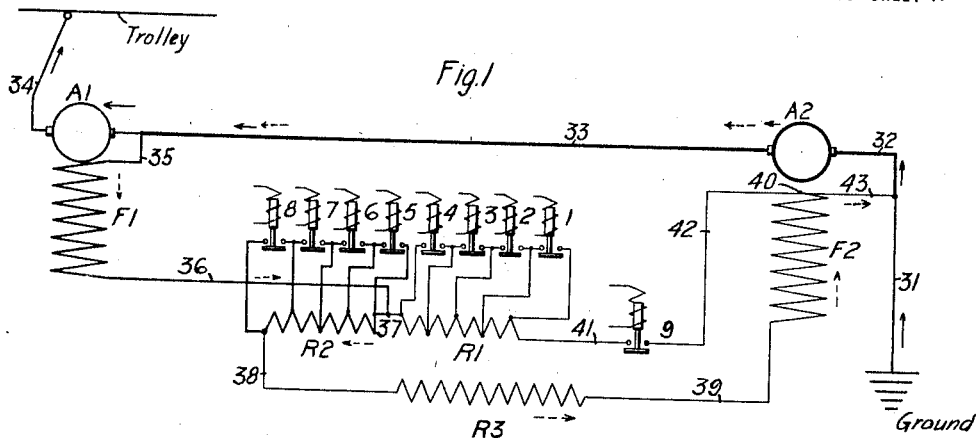
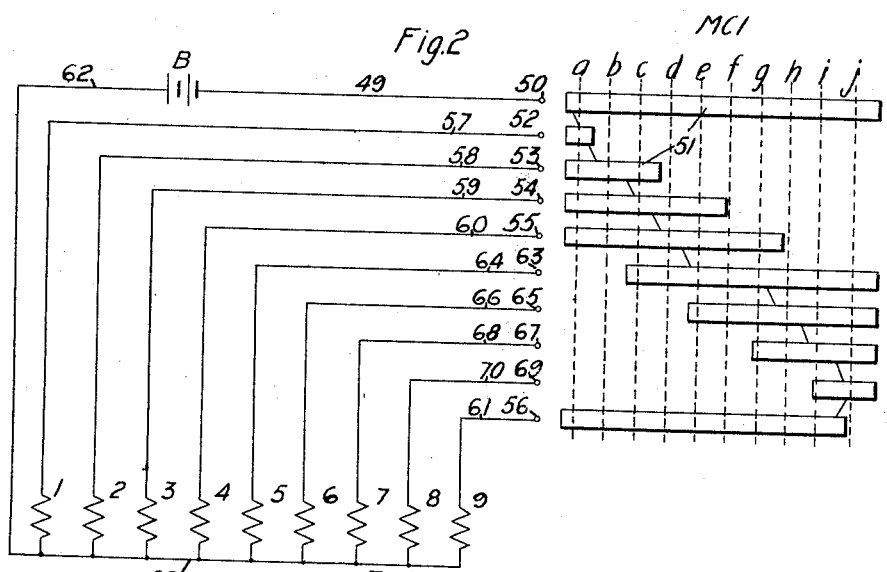
WITNESSES:
INVENTOR
Rudolf E. Hellmund
BY
ATTORNEY R. E. HELLMUND.
SYSTEM OF CONTROL.
APPLICATION FILED SEPT. 7, 1917.
1,320,057.
Patented Oct. 28, 1919.
3 SHEETS—SHEET 2.
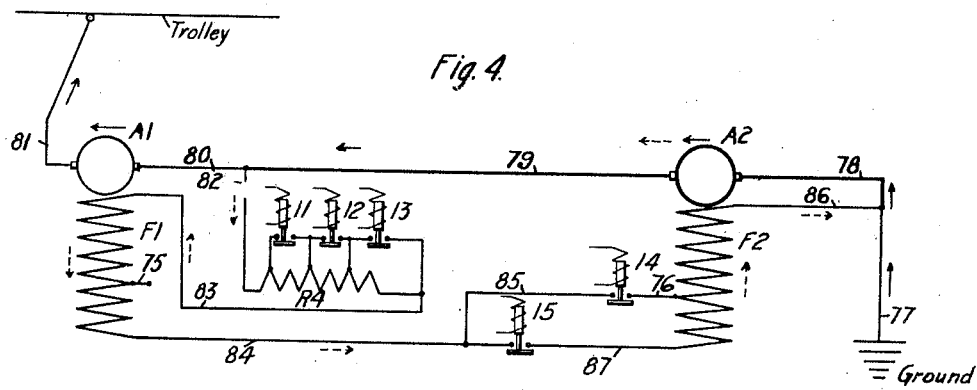
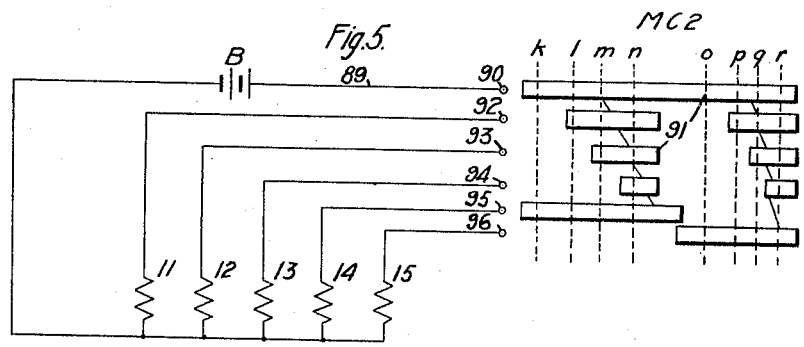
Fig. 6
| Steps | Switches | | | | |
|---|---|---|---|---|---|
| | 11 | 12 | 13 | 14 | 15 |
| k | | | | o | |
| l | o | | | o | |
| m | o | o | | o | |
| n | o | o | o | o | |
| o | | | | | o |
| p | o | | | | o |
| q | o | o | | | o |
| r | o | o | o | | o |
WITNESSES:
J.T. Wurmb
W.R. Coley
INVENTOR
Rudolf E. Hellmund
BY
Wesley G. Carr
ATTORNEY R. E. HELLMUND.
SYSTEM OF CONTROL.
APPLICATION FILED SEPT. 7, 1917.
1,320,057.
Patented Oct. 28, 1919.
3 SHEETS—SHEET 3.
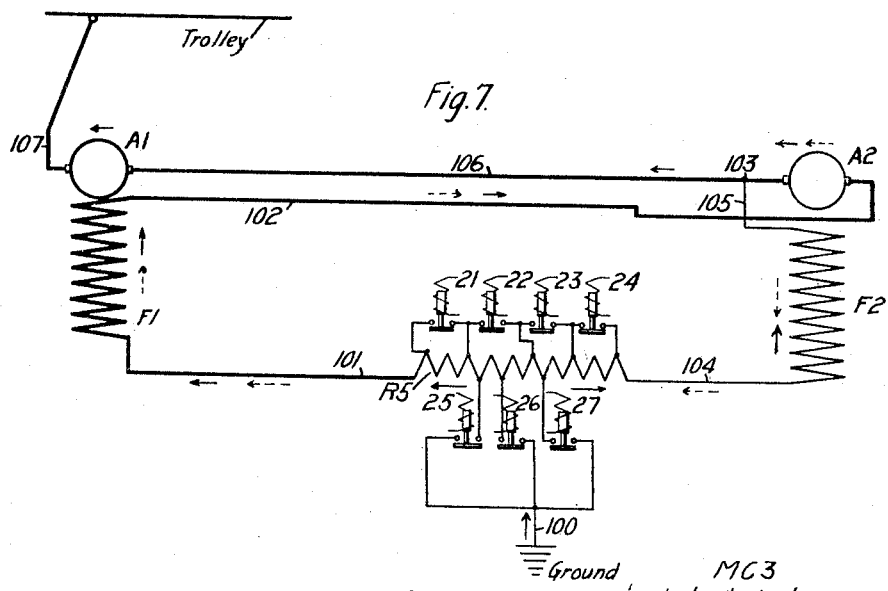
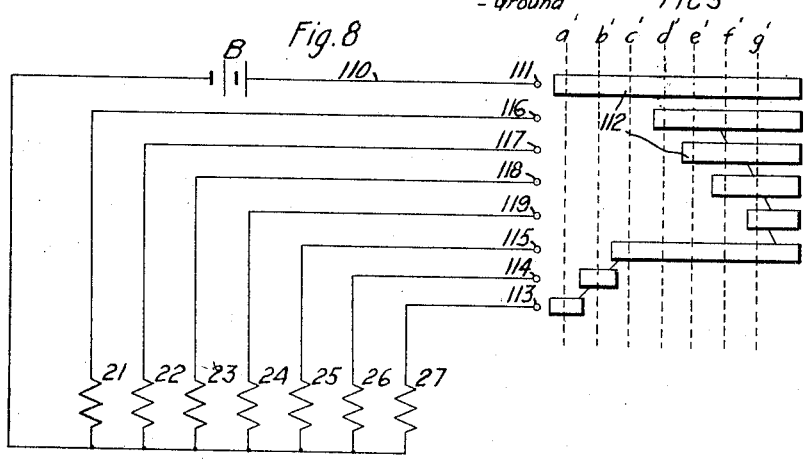
WITNESSES:
INVENTOR
Rudolf E. Hellmund
BY
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,320,057.  Specification of Letters Patent.  Patented Oct. 28, 1919.

Application filed September 7, 1917. Serial No. 190,136.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Systems of Control, of which the following is a specification.

My invention relates to systems of control, and particularly to the regenerative control of electric railway motors and the like.

Various systems have heretofore been proposed to obtain regenerative operation of a plurality of dynamo-electric machines without employing a separate or auxiliary machine for exciting the main field windings. However, certain of these systems have the disadvantage of utilizing only a portion of the motors for braking purposes, since the exciting machine has a substantially negligible torque. Other systems excite the main field winding from the supply circuit, which requires relatively large values of resistance in series relation with the field windings, and, consequently, material operating losses.

It is the object of my present invention to provide a favorable compromise system, whereby more efficient braking conditions may be secured than pertain to prior systems of the first-mentioned type and whereby less losses are entailed than pertain to systems of the other type referred to.

More specifically stated, it is the object of my invention to provide a system of the above-indicated character wherein a plurality of similar armatures are connected in series relation across the supply circuit, one of the armatures being also connected to excite all of the field windings, but operating at a lower voltage range or average voltage than the other machines.

My invention may best be understood by reference to the accompanying drawings, wherein Figure 1 is a diagrammatic view of the main circuits of a system of control embodying the invention; Fig. 2 is a diagrammatic view of an auxiliary governing system for the circuits of Fig. 1; Fig. 3 is a sequence chart of well-known form indicating the preferred order of operation of the various illustrated switches; and Fig. 4 to Fig. 6, inclusive, and Fig. 7 to Fig. 9, inclusive, are views, respectively corresponding to Fig. 1 to Fig. 3, inclusive, of modified forms of my invention.

Referring to Fig. 1 of the drawings, the system shown comprises supply-circuit conductors Trolley and Ground; a plurality of similar main dynamo-electric machines respectively having commutator-type armatures A1 and A2 and field windings F1 and F2 of the series type; a plurality of resistors R1, R2 and R3, that are connected in circuit in a manner to be set forth; and a plurality of resistance-varying switches 1 to 9, inclusive, for regulating the operation of the system.

Assuming that regenerative operation has been begun in any suitable manner, the regenerative or armature circuit, indicated by the solid arrows, is established from the supply-circuit conductor Ground, through conductors 31 and 32, main armature A2, conductor 33, main armature A1 and conductor 34 to the trolley.

The exciting or field-winding circuit, indicated by the dotted arrows, is established from the positive terminal of the armature A2, through conductors 33 and 35, field winding F1 and conductor 36, to a junction-point 37, where the circuit divides, one branch traversing variable resistor R2, conductor 38, fixed resistor R3, conductor 39 and field winding F2 to another junction-point 40, and the other branch traversing variable resistor R1, conductor 41, switch 9, and conductor 42 to the junction-point 40, whence circuit is completed, through conductors 43 and 32, to the negative terminal of the armature A2.

It will be observed that the field winding F2, corresponding to the exciting armature A2, has a relatively weak initial excitation by reason of being shunted by the fixed resistor R3 and the variable resistors R1 and R2, whereas the other field winding F1 receives the full exciting current. Consequently, the exciting armature A2 has a lower initial voltage than the other armature A1, although the armature A2 carries substantially twice the current that traverses the armature A1, since both the regenerated and the exciting current flow through the armature A2. It will be seen, therefore, that a relatively weak current in the armature A1 is coupled with a relatively strong current in the corresponding field winding F1, while a relatively strong current in the exciting armature A2 is associated with a relatively weak current in the allied field winding F2. Consequently, the regenerative torque of the two machines may be approximately the same.

However, if, at the beginning of the regenerative period, the exciting armature A2 is assumed to have a voltage of 20%, for example, of the supply-circuit voltage, the armature A1 providing the remaining 80%, and, if the circuits are so regulated that the gradual decrease of machine speed is compensated by a corresponding increase of the voltage of the exciting armature A2 to substantially one-half of the supply-circuit voltage, then the additional operating losses, caused by the use of one of the machines as an exciter, amount to only about one-third of what the losses would be with the main field windings energized through voltage-reducing resistors from the supply circuit. The operating economy, in addition to the reduced first cost, of my present system, are thus obvious.

The auxiliary governing system illustrated in Fig. 2 comprises the actuating coils of the several switches that are shown in Fig. 1, together with a master controller MC1 that is adapted to occupy a plurality of operative positions $a$ to $j$, inclusive, and a suitable auxiliary source of energy, such as a battery B.

By actuating the master controller to its initial operative position $a$, a circuit is established from the positive terminal of the battery B through conductor 49 and control finger 50 to contact segment 51, which further engages control fingers 52 to 56, inclusive, from which points, circuits are respectively completed through conductors 57 to 61, inclusive, to the actuating coils of the switches 1, 2, 3, 4 and 9, as indicated in step $a$ of the sequence chart, Fig. 3, and thence, through a common conductor 62, to the negative terminal of the battery B.

The resistor R1 is thus initially short-circuited while the entire resistor R2 is active. In this way, the resistors R2 and R3 are shunted across the field winding F2, corresponding to the exciting armature, to initially weaken the effect of that field winding while exciting current of a comparatively high value traverses the other field winding F1.

To effect the desired compensation for the gradual decrease of machine speed during the retardation period, the master controller MC1 may be successively moved through its operative positions $b$ to $j$, inclusive. In positions $b$, $d$, $f$, and $h$, control fingers 52, 53, 54 and 55 successively become disengaged from the contact segment 51 to gradually insert the resistor R1 in circuit, thus increasing the voltage drop across the field winding F2 and correspondingly augmenting the delivered voltage of the armature A2.

In positions $c$ $e$, $g$ and $i$, new circuits are completed from the contact segment 51 through control fingers 63, 65, 67 and 69 and conductors 64, 66, 68 and 70 to the actuating coils of the switches 5, 6, 7, and 8, respectively. The resistor R2 is thus gradually short-circuited to increase the exciting current that traverses the field winding F1, the arrangement of parts being such that such short-circuit of the resistor R2 is more than counteracted by the gradual inclusion of the resistor R1 in circuit, so that the combined effect of the resistor regulation upon the field winding F2 is to gradually increase the excitation thereof.

In the final position $j$ of the master controller, the actuating coil of the switch 9 is deënergized to connect the field winding F2 in straight series relation with the remainder of the exciting circuit, thus further increasing the current traversing that field winding.

In this way, the excitation of the field winding F2, and, therefore, the voltage of the corresponding exciting armature A2, may be gradually increased from a relatively low initial exciting voltage to substantially one-half of the supply-circuit voltage, whereby a regenerated current is maintained during the speed-decreasing period of the machines. It is thus evident that the operating voltage range of the exciting armature A2 is materially lower than the voltage range of the other armature A1, although both of the armatures contribute to the regenerative operation.

In Fig. 4, the system shown comprises supply-circuit conductors Trolley and Ground; the main armatures A1 and A2, and main field windings F1 and F2, which, in this case, however, are provided with intermediate voltage taps 75 and 76, respectively, in accordance with the well-known "field-control" connections; a resistor R4, which may be varied in active circuit value by means of a plurality of switches 11, 12 and 13; and a plurality of field-control switches 14 and 15 for the field winding F2.

The regenerative or main-armature circuit, indicated by the solid arrows, is established from the ground through conductors 77 and 78, main armature A2, conductors 79 and 80, armature A1, and conductor 81 to the trolley.

The exciting or field-winding circuit is established from the positive terminal of the exciting armature A2 through conductors 79 and 82, resistor R4, conductor 83, field winding F1, conductors 84 and 85, switch 14, voltage tap 76, a portion of the field windnng F2 and conductors 76 and 78 to the negative terminal of the exciting armature A2.

The effective flux of the field winding F2 is thus initially lower than that of the field winding F1 by reason of the intermediate connection just described. Consequently, the initial exciting voltage of the armature A2 is correspondingly less than the regenerated voltage of the other armature A1.

In Fig. 5, a master controller MC2, having operative positions $k$ to $r$, inclusive, is employed in conjunction with the battery B for suitably governing the switches 11 to 15, inclusive.

In the initial position $k$ of the master controller, a circuit is established from the positive terminal of the battery B through conductor 89 and control finger 90 to contact segment 91, which also engages control finger 95, whereby switch 14 is closed. Thus, the initial main-circuit connections just traced are established, the entire resistor R4 being included in circuit and only a portion of the field winding F2, corresponding to the exciting armature A2, being active.

In positions $l$, $m$ and $n$ of the master controller, control fingers 92, 93 and 94 are successively engaged to effect energization of the actuating coils of the switches 11, 12 and 13, respectively, thereby gradually short-circuiting the resistor R4 and increasing the exciting current that traverses the field windings to compensate for the decrease in machine speed.

When the master controller is moved toward its position $o$, the contact segment 91 first becomes disengaged from the control fingers 92, 93 and 94, secondly, engages control finger 96 to energize the actuating coils of the switch 15, and finally, disengages the control finger 95 to open the switch 14. In this way, the entire field winding F2 is included in circuit, the resistor R4 being active during the transition from partial to full-field connection. The generated voltage of the exciting armature A2 is correspondingly increased.

In positions $p$, $q$ and $r$, control fingers 92, 93 and 94 are again engaged by the contact segment 91 to effect the successive closure of the switches 11, 12 and 13, whereby the resistor R4 is gradually short-circuited.

In this way, the energization of the field winding F1 is increased during the two speed ranges corresponding to the use of a portion of the field winding F2 and of the entire field winding, while the voltage of the exciting armature A2 is increased by such change of connections of the field winding F2. It will be understood that more than one step of variation of field-winding connections may be employed, if desired, in carrying out the present form of the invention.

Referring to Fig. 7, the system shown comprises, in addition to the previously-mentioned supply-circuit conductors and machines, a variable resistor R5 and a plurality of resistance-varying switches 21 to 27, inclusive.

Assuming that regenerative operation is in progress, the main-armature circuit, indicated by the solid arrows, is established from the ground through conductor 100, switch 27, for example, where the circuit divides, one branch including a portion of the resistor R5, conductor 101, field winding F1, conductor 102 and armature A2 to a junction-point 103, and the other branch traversing the remaining portion of the resistor R5, conductor 104, field winding F2 and conductor 105 to the junction-point 103, whence a common circuit is completed through conductor 106, armature A1 and conductor 107 to the trolley.

The exciting or field-winding circuit, indicated by the dotted arrows, is established from the positive side of the exciting armature A2 through junction-point 103, conductor 105, field winding F2, conductor 104, resistor R5, conductor 101, field winding F1 and conductor 102 to the negative terminal of the armature A2. It will be seen that the regenerating and exciting currents oppose each other, or are differentially related, in the field winding F2, corresponding to the exciting armature A2, but assist each other, or are additively related, in the other field winding F1. In this way, a weakening effect of the field winding F2, similar to that set forth in the previous figures, is secured, and thus, initially, the exciting armature A2 generates a materially lower voltage than the armature A1.

Any desired division of the regenerated current through the field windings may be secured by varying the connection of the supply-circuit conductor Ground to the resistor R5 through the switches 25, 26 and 27, for example, while the switches 21 and 24 may be employed to gradually short-circuit the resistor as the machine speed decreases.

An auxiliary control system for effecting the desired regulation is shown in Fig. 8, wherein the battery B and a master controller MC3, that is adapted to occupy a plurality of operative positions $a'$ to $g'$, inclusive, are utilized to govern the operation of the actuating coils for the switches 21 to 27 in accordance with the sequence chart, Fig. 9.

When the master controller MC3 is moved to its initial operative position $a'$, a circuit is established from the positive terminal of the battery B through conductor 110, control finger 111, contact segment 112 and control finger 113, to the actuating coil of the switch 27, whereby the previously-traced main circuit is established.

In positions $b'$ and $c'$, control fingers 114 and 115 engage the contact segment 112 to effect the closure of the switches 26 and 25, respectively, whereby the value of the regenerated current that traverses the field winding F1 is gradually increased while the portion of such current flowing through the field winding F2 is gradually decreased, thus, in both cases, effecting an increase of the voltages of the armatures A1 and A2 to compensate for the decrease of machine speed.

In the remaining controller positions $d'$ to $g'$, inclusive, control fingers 116 to 119, inclusive, successively engage the contact segment 112, whereby the actuating coils for the switches 21 to 24, inclusive, are respectively energized to gradually short-circuit the resistor R5 and thus further increase the excitation of the two field windings for the previously-mentioned purpose.

I do not wish to be restricted to the specific circuit connections or arrangement of parts herein set forth, as various other modifications thereof may be effected without departing from the spirit and scope of my invention. I desire, therefore, that only such limitations shall be imposed as are indicated in the appended claims.

I claim as my invention:

1. In a system of control, the combination with a supply circuit, of a plurality of dynamo-electric machines operatively connected to said supply circuit, one of said machines being also connected to excite another and having a lower average voltage than said other machine.

2. In a system of control, the combination with a supply circuit, of a plurality of similar dynamo-electric machines regeneratively connected to said supply circuit, one of said machines being also connected to excite another, and means for producing different voltage ranges upon the respective machines.

3. In a system of control, the combination with a supply circuit, of a plurality of dynamo-electric machines operatively connected to said supply circuit and severally having armatures and field windings, one of said armatures being connected to excite all of said field windings and having a lower range of voltage than any other machine.

4. In a system of control, the combination with a supply circuit, of a plurality of similar dynamo-electric machines regeneratively connected to said supply circuit, one of said machines being also connected to excite all of said field windings, and switching means for maintaining a lower average voltage upon the exciting armature than upon any other.

5. In a system of control, the combination with a supply circuit, of a plurality of armatures connected in series relation across said supply circuit, field windings for all of said armatures excited from one of them, and means for maintaining a lower average voltage upon the field winding corresponding to the exciting armature than upon any other field winding.

6. In a system of control, the combination with a plurality of supply-circuit conductors, of a plurality of dynamo-electric machines having series-related armatures and field windings excited from one of said armatures, and means for so connecting one of the supply-circuit conductors to the field-winding circuit that the armature current traverses the respective field windings oppositely and additively.

7. In a system of control, the combination with a plurality of supply-circuit conductors, of a plurality of dynamo-electric machines having series-related armatures and field windings excited from one of said armatures, and means for so connecting one of the supply-circuit conductors to the field-winding circuit that the armature current oppositely traverses the field winding corresponding to the exciting armature and additively traverses the field winding corresponding to another armature.

8. In a system of control, the combination with a plurality of supply-circuit conductors, of a variable resistor, a plurality of similar dynamo-electric machines having series-related armatures and field windings excited through said resistor from one of said armatures, and means for variably connecting one of the supply-circuit conductors to said resistor.

9. In a system of control, the combination with a supply circuit, of two similar dynamo-electric machines severally having armatures and field windings, means for reducing the exciting effect of one of said field windings, and means for so interconnecting the armatures and field windings that the armature corresponding to the weakened field winding carries a relatively heavy current while the other armature carries a relatively weak current, whereby the two machine torques may be maintained approximately equal.

In testimony whereof, I have hereunto subscribed my name this 23rd day of August, 1917.

RUDOLF E. HELLMUND.

Copies of this patent may be obtained for five cents each, by addressing the "Commissioner of Patents, Washington, D. C."